United States Patent

Nishimura et al.

Patent Number: 5,982,566
Date of Patent: Nov. 9, 1999

[54] ZOOM LENS BARREL

[75] Inventors: Syunji Nishimura; Kazuhiko Onda, both of Saitama-ken, Japan

[73] Assignee: Fuji Photo Optical Co., Ltd., Saitama-ken, Japan

[21] Appl. No.: 09/136,568

[22] Filed: Aug. 19, 1998

[30] Foreign Application Priority Data

Aug. 19, 1997 [JP] Japan .................................. 9-222256

[51] Int. Cl.⁶ .................................................. G02B 15/14
[52] U.S. Cl. .......................................... 359/822; 359/694
[58] Field of Search .................................... 359/823, 699, 359/700, 701, 694

[56] References Cited

U.S. PATENT DOCUMENTS 5,699,200 12/1997 Uno ........................................ 359/700

FOREIGN PATENT DOCUMENTS

6-100707 12/1994 Japan .
9-49958 2/1997 Japan .

Primary Examiner—Georgia Epps
Assistant Examiner—Michael A. Lucas
Attorney, Agent, or Firm—Sixbey, Friedman, Leedom & Ferguson, P.C.; Donald R. Studebaker

[57] ABSTRACT

A lens barrel for a zoom lens includes first and second lens groups arranged in the direction of an optical axis. A first rotary barrel is rotatable about the optical axis and is rotated to move the first lens group in the direction of the optical axis, and a second rotary barrel is provided coaxially with the first rotary barrel. A guide groove is provided on the second rotary barrel and guides the second lens group to move it in the direction of the optical axis in response to rotation of the second rotary barrel. A rotation transmission mechanism is disposed between the first and second rotary barrels to be able to engage to rotate both the first and second rotary barrels, thereby zooming the zoom lens, and to be able to disengage to rotate only one of the first and second rotary barrels through a predetermined angle range with the other held stationary so that focusing the zoom lens can be effected by rotating said one rotary barrel within the predetermined angle range.

7 Claims, 8 Drawing Sheets

ZOOM LENS BARREL

BACKGROUND OF THE INVENTION

1. Field of the Invention

This invention relates to a zoom lens barrel, and more particularly to a zoom lens barrel in which zooming and focusing can be effected by a single drive source.

2. Description of the Related Art

In a camera with a zoom lens, generally zooming is effected by moving lens groups in the direction of the optical axis by a cam and the like while focusing is effected by moving the lens groups in a manner different from that in zooming.

As the method of moving the lens groups of the zoom lens in such a manner, there have been known the following methods.

(1) Separate drive sources are used for zooming and focusing.

(2) Drive force of a single drive source is divided and transmitted to the zooming mechanism and the focusing mechanism.

(3) A single drive force is used and zooming and focusing are alternately effected on a continuous locus. See Japanese Patent Publication No. 6(1994)-100707.

(4) A cam ring rotated by a single drive source is provided with first and second cam grooves which respectively move first and second groups in the direction of the optical axis in response to rotation of the cam ring. When the cam ring is rotated in one direction (toward telephoto side or wide-angle-side), the first and second lens groups are moved back and forth by way of the first and second cam grooves whereby the lens is zoomed. When the cam ring is rotated in the other direction after the zooming action, the second cam groove does not act on the second lens groove for a predetermined focusing segment and only the first lens group is moved, whereby the lens is focused. See Japanese Unexamined Patent Publication No. 9(1997)-49958.

However the method of (1) is disadvantageous in that since two drive sources are required, cost of the camera is increased. The method of (2) increases the number of components, which results in a larger size of the camera. The method of (3) is disadvantageous in that zooming cannot be effected continuously and focusing can be effected only at a plurality of particular focal lengths (a step zoom).

Further in the method of (4), though continuous zooming is possible, the following problem arises. That is, the second cam groove is provided with a first cam surface which acts when zooming from the wide-angle-side to telephoto side and a second cam surface which acts when zooming from the telephoto side to the wide-angle-side and the first and second cam surfaces are opposed to each other wide spaced in the direction of the optical axis from a cam follower which is provided on a lens holder for the second lens group and is in engagement with the second cam groove. That is, there is play in the direction of rotation of the cam ring between the cam groove and the cam follower. Accordingly, an unintentional movement of the second lens group can occur under its gravity of the like during zooming, which can result in undesirable zooming, unless the cam follower is pressed against the first or second cam surface by an urging means such as a spring. However when such an urging means is provided, the drive system must operate overcoming the force of the urging means during focusing, which adds to the load on the drive source.

SUMMARY OF THE INVENTION

In view of the foregoing observations and description, the primary object of the present invention is to provide a zoom lens barrel which is free from the problems described above and is small in size and is inexpensive.

The lens barrel for a zoom lens in accordance with the present invention comprises first and second lens groups arranged in the direction of an optical axis, a first rotary barrel which is rotatable about the optical axis and is rotated to move the first lens group in the direction of the optical axis, a second rotary barrel provided coaxially with the first rotary barrel, a guide means which is provided on the second rotary barrel and guides the second lens group to move it in the direction of the optical axis in response to rotation of the second rotary barrel, and a rotation transmission mechanism which is disposed between the first and second rotary barrels to be able to engage to rotate both the first and second rotary barrels, thereby zooming the zoom lens and to be able to disengage to rotate only one of the first and second rotary barrels through a predetermined angle range with the other held stationary so that focusing the zoom lens can be effected by rotating said one rotary barrel within the predetermined angle range.

In one preferred embodiment of the present invention, the second lens group is positioned rearward of the first lens group in the direction of the optical axis and the rotation transmission mechanism disengages to rotate only the first rotary barrel through the predetermined angle range with the second rotary barrel held stationary.

For example, zooming in one direction is effected by rotating the first rotary barrel in one direction, and focusing is effected by rotating the first rotary barrel in the other direction over the predetermined angle range, while zooming in the other direction is effected by rotating the first rotary barrel in the other direction, beyond the predetermined angle, and focusing is effected by rotating the first rotary barrel in said one direction within the predetermined angle range.

For example, the second rotary barrel is disposed inside the first rotary barrel, and the rotation transmission mechanism comprises a drive gear which is in mesh with a gear portion formed on the inner circumferential surface of the first rotary barrel, and idle gear which is disposed coaxially with the drive gear and is in mesh with a gear portion formed on the outer circumferential surface of the second rotary barrel, a projection provided on one of the drive gear and the idle gear, and a pair of engagement portions which are provided on the other of the drive gear and the idle gear so that the engagement portions are brought into engagement with the projection at the respective ends of said predetermined angle range.

For example, the engagement portions may be the end faces of an arcuate groove or slit which is formed on one of the drive gear and the idle gear to extend through said predetermined angle range coaxially with the gear and into which the projection on the other gear is inserted.

Said guide means may be a cam groove which is formed on the second rotary barrel and with which a cam follower formed on a lens holder holding the second lens group is engaged.

The cam groove may be provided with portions which extend in perpendicular to the optical axis through the angle range through which only the first rotary barrel is rotated.

In the lens barrel for a zoom lens, by virtue of the rotation transmission mechanism disposed between the first and second rotary barrels which can be engaged to rotate both the first and second rotary barrels, thereby zooming the zoom lens, and can be disengaged to rotate only one of the first and second rotary barrels through a predetermined angle range with the other held stationary so that focusing the zoom lens can be effected by rotating said one barrel within the predetermined angle range, a zoom lens barrel in which zooming and focusing can be effected by a single drive source and zooming can be effected continuously can be obtained at low cost without increasing the size and complicating the structure.

When the lens barrel is arranged so that focusing is effected by rotating said one rotary barrel in the direction opposite to that in which the rotary barrel is rotated for zooming, control of the lens barrel is facilitated and focusing can be effected at any focal length.

When said rotation transmission mechanism comprises a projection provided on one of a drive gear and an idle gear and a pair of engagement portions which are provided on the other of the drive gear, that is, play is provided between the drive gear and the idle gear in the direction of rotation, the first and second rotary barrels are rotated together when one of them is rotated in one direction beyond an angular position where the projection is brought into engagement with one of the engagement portions and the first and second lens groups are moved together in the direction of the optical axis, whereby the zoom lens is zoomed. Then when said one rotary barrel is rotated in the other direction, only the one rotary barrel is rotated with the other rotary barrel held stationary until the projection is brought into engagement with the other engagement portion and only the lens group associated with said one rotary barrel is moved in the direction of the optical axis, whereby the zoom lens is focused at the focal length. Thus the above object can be accomplished with a very simple structure.

When the guide means which guides the second lens group to move it in the direction of the optical axis in response to rotation of the second rotary barrel is a cam groove which is formed on the second rotary barrel and with which a cam follower formed on a lens holder holding the second lens group is engaged, switching between zooming and focusing is made not by virtue of play between the cam groove and the cam follower but by virtue of play in the direction of rotation between the drive gear and the idle gear. Accordingly, an urging means for pressing the cam follower against the first or second cam surface, which is required in the arrangement disclosed in Japanese Unexamined Patent Publication No. 9(1997)-49958, becomes unnecessary, whereby increase in the load on the drive source can be prevented.

Further when the cam groove is of a smooth straight line or curve, continuous zooming is feasible and focusing can be effected at any focal length.

However since the cam groove is inclined to the optical axis and the lens holder for the second lens group provided with the cam follower is generally urged in the direction of the optical axis by a spring, there is fear that the second rotary barrel is rotated during focusing by the spring and/or other external turbulence. Such an unintended rotation of the second rotary barrel during focusing can be prevented by forming groove portions extending in perpendicular to the optical axis at a plurality of places of the cam groove, and effecting focusing when the cam follower is in the groove portions, though this results in step zooming.

DESCRIPTION OF THE PREFERRED EMBODIMENT

Figure 1:
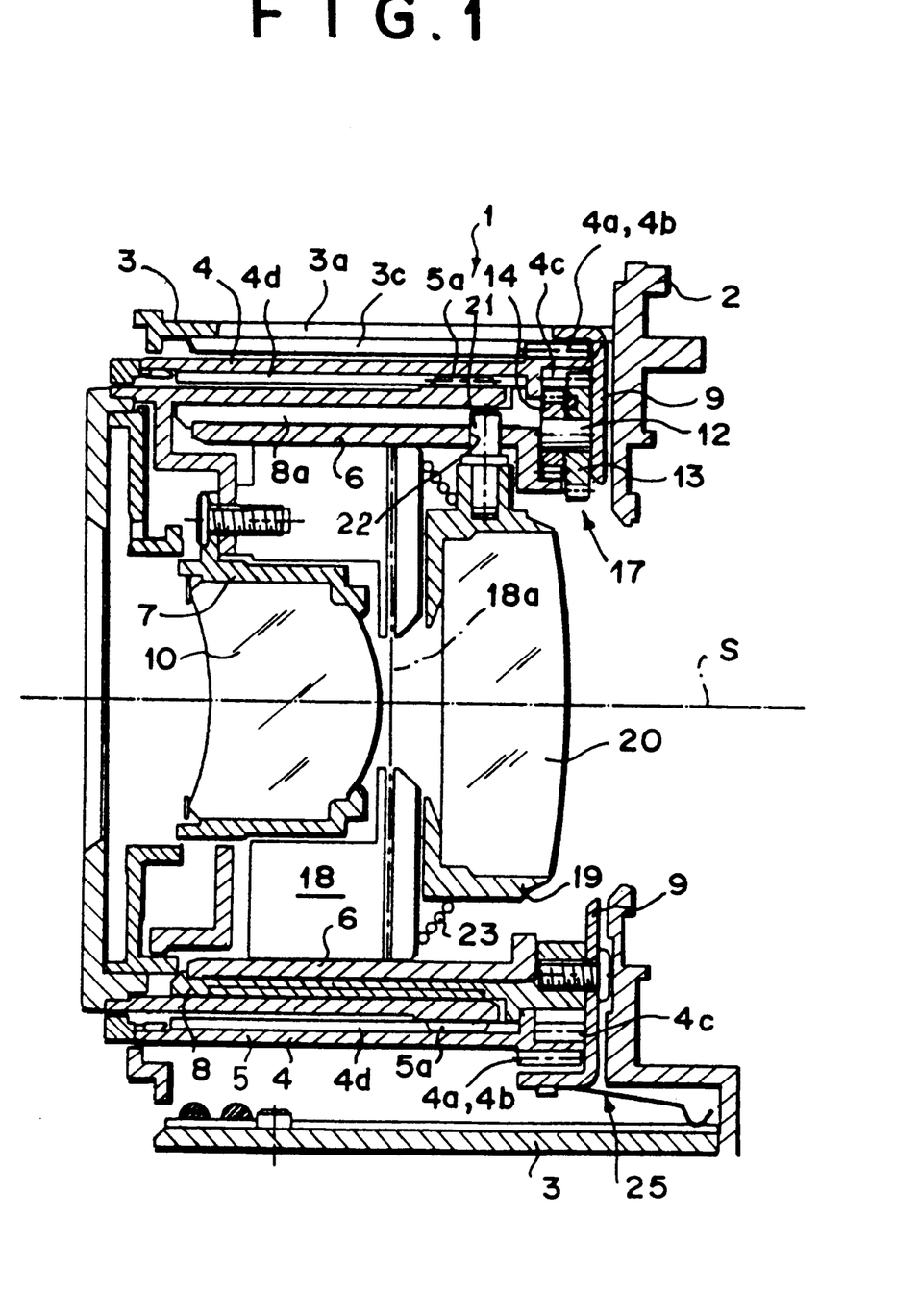
FIG. 1 is a cross-sectional view of a zoom lens barrel in a retracted position in accordance with an embodiment of the present invention.
Figure 2:
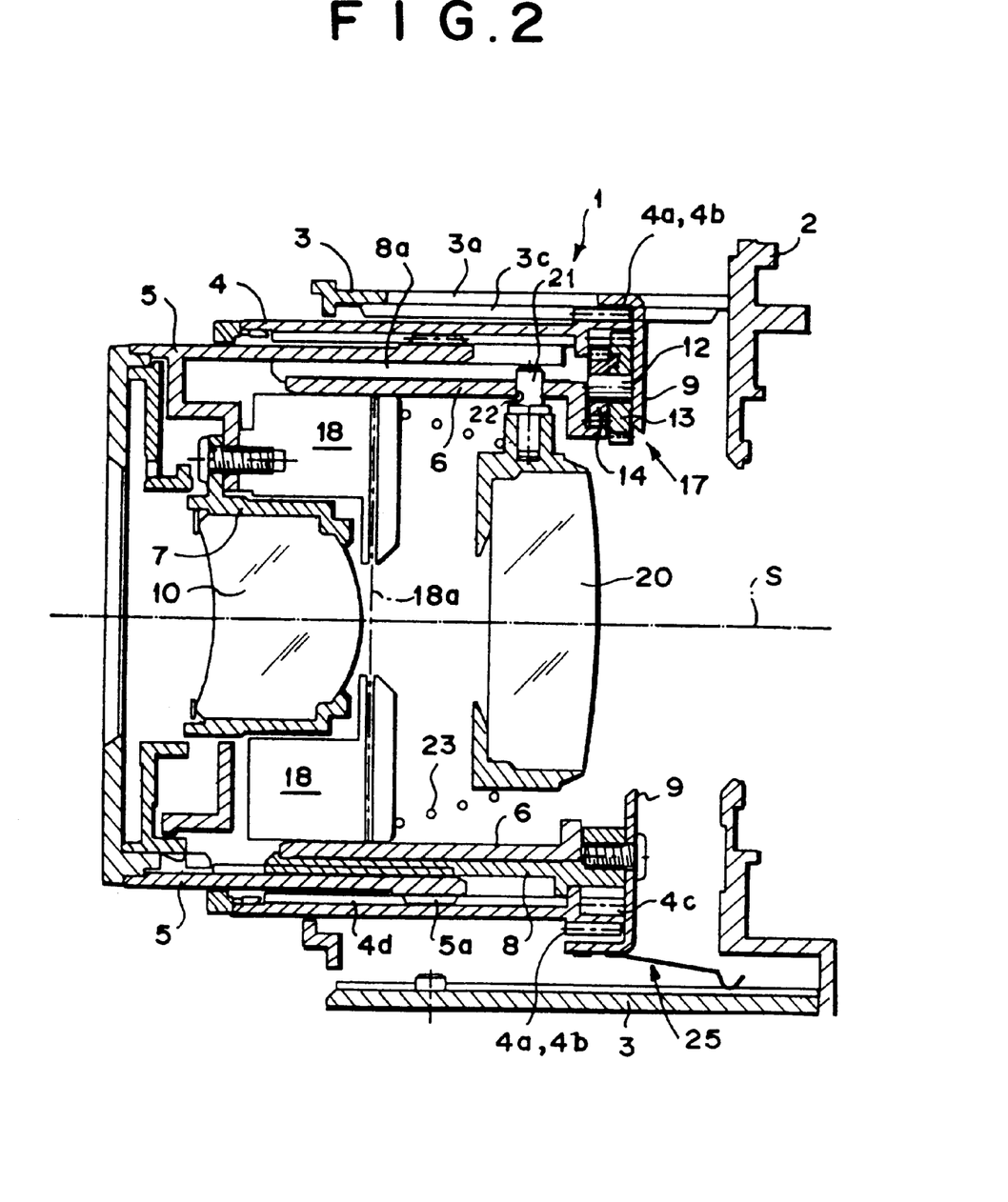
FIG. 2 is a cross-sectional view of the zoom lens barrel in a wide-angle position.
Figure 3:
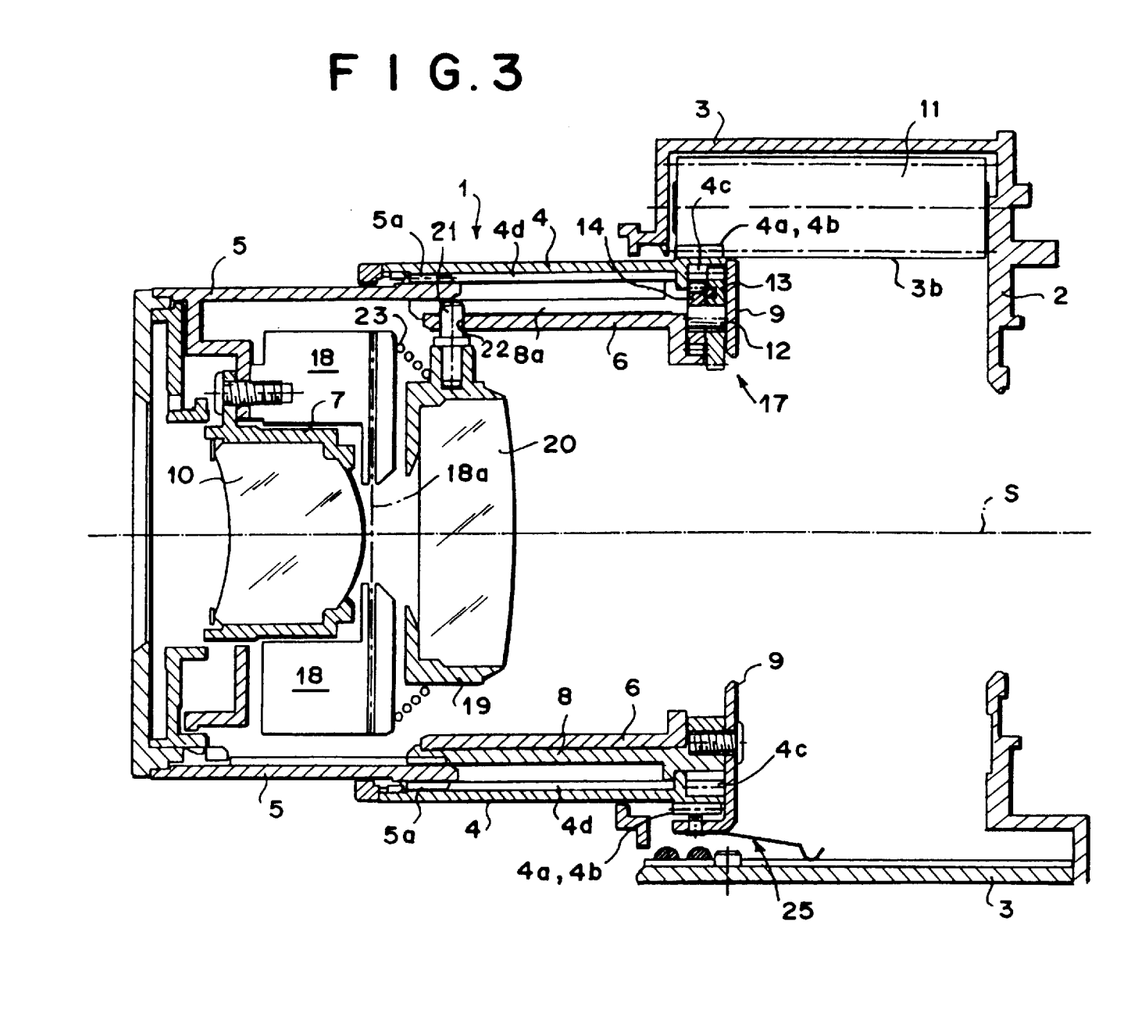
FIG. 3 is a cross-sectional view of the zoom lens barrel in a tele-position.

A zoom lens barrel in accordance with an embodiment of the present invention will be described with reference to the drawings. FIGS. 1 to 3 are cross-sectional views along a vertical plane including the optical axis. The drive mechanism of the outer intermediate barrel is abbreviated in FIGS. 1 and 2.

The zoom lens barrel 1 of this embodiment comprises a fixed barrel 3 fixed to a camera body 2 and an intermediate barrel (first rotary barrel) 4 which is coaxially disposed inside the fixed barrel 3. The outer intermediate barrel 4 is provided on its outer circumferential surface with a male helicoid 4a in engagement with a female helicoid 3c on the inner circumferential surface of the fixed barrel 3 and is moved in the direction of the optical axis S driven by a drive motor (not shown) through a long gear 11 (FIG. 3). A movable barrel 5 is coaxially disposed inside the intermediate barrel 4. The movable barrel 5 is provided on its outer circumferential surface with a male helicoid 5a in engagement with a female helicoid 4d on the inner circumferential surface of the intermediate barrel 4 to be projected forward from the front end of the intermediate barrel 4 and retracted into the intermediate barrel 4 in the direction of the optical axis S in response to rotation of the intermediate barrel 4. A cam barrel (second rotary barrel) 6 is coaxially disposed inside the movable barrel 5. A front lens group (first lens group) 10 held by a lens holder 7 and a shutter block 18 provided with a shutter blade 18a are fixed to the front end portion of the movable barrel 5.

A key barrel 8 which guides the movable barrel 5 to move straight in the direction of the optical axis S and supports the cam barrel 6 for rotation is disposed inside the intermediate barrel 4. A key plate 9 is fixed to the rear end of the key barrel 8. The key plate 9 is in engagement with a groove 3a formed on the inner surface of the fixed barrel 3 to extend in the direction of the optical axis S, and holds the key barrel 8 not to rotate. Further the rear end portion of the intermediate barrel 4 is supported for rotation between the key plate 9 and the key barrel 8. With this arrangement, the key plate 9 and the key barrel 8 are moved in the direction of the optical axis S as the intermediate barrel 4 moves in the direction of the optical axis S while rotating.

As shown in FIG. 3, a long gear 11 having a long tooth face extending in the direction of the optical axis S and driven by an electric motor (not shown) is mounted for rotation on the outer side of the fixed barrel 3. The fixed barrel 3 is provided with a slit 3b which extends in the direction of the optical axis S along the long gear 11.

Figure 4:
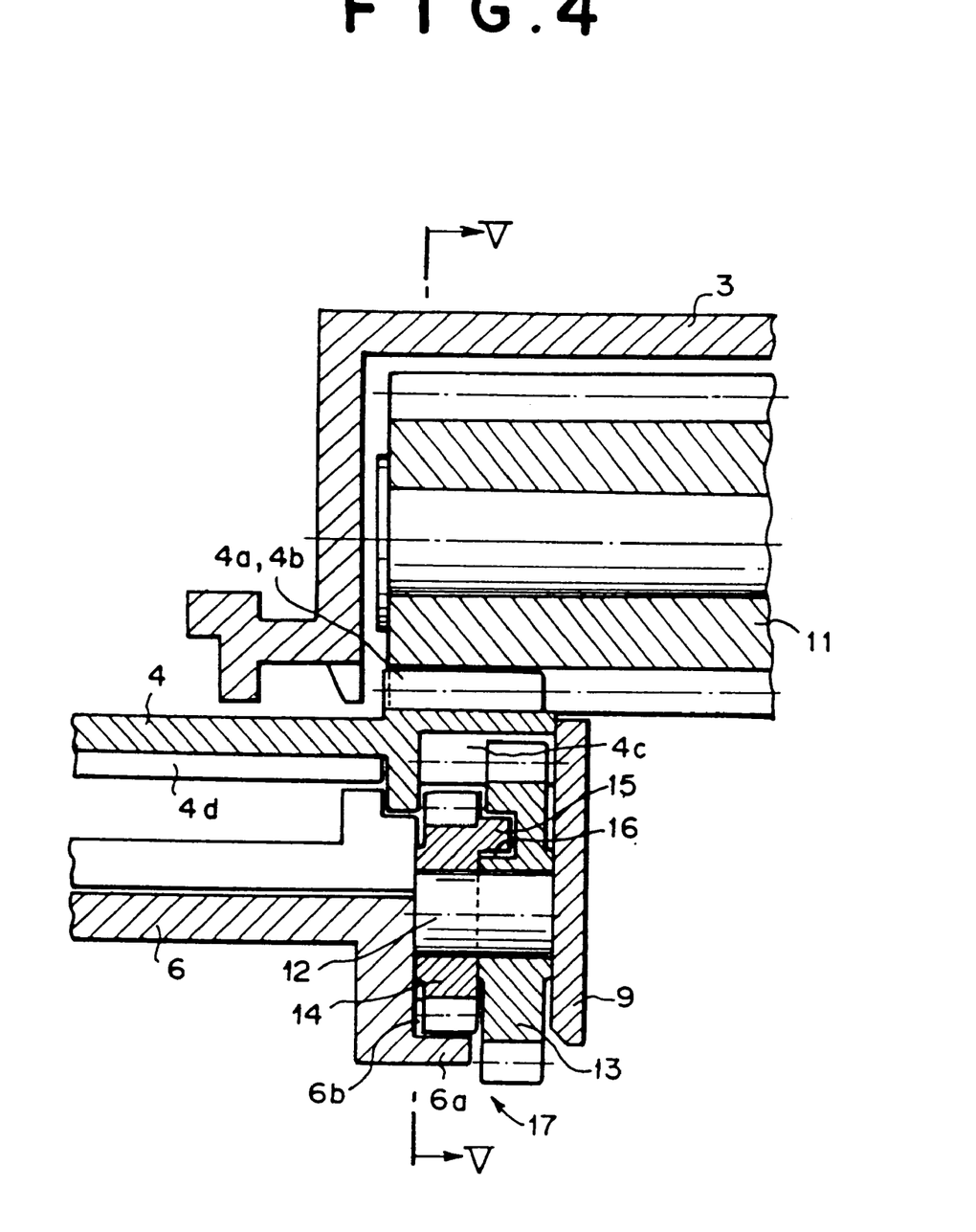
FIG. 4 is an enlarged view of the rotation transmission mechanism shown in FIG. 3.
Figure 5:
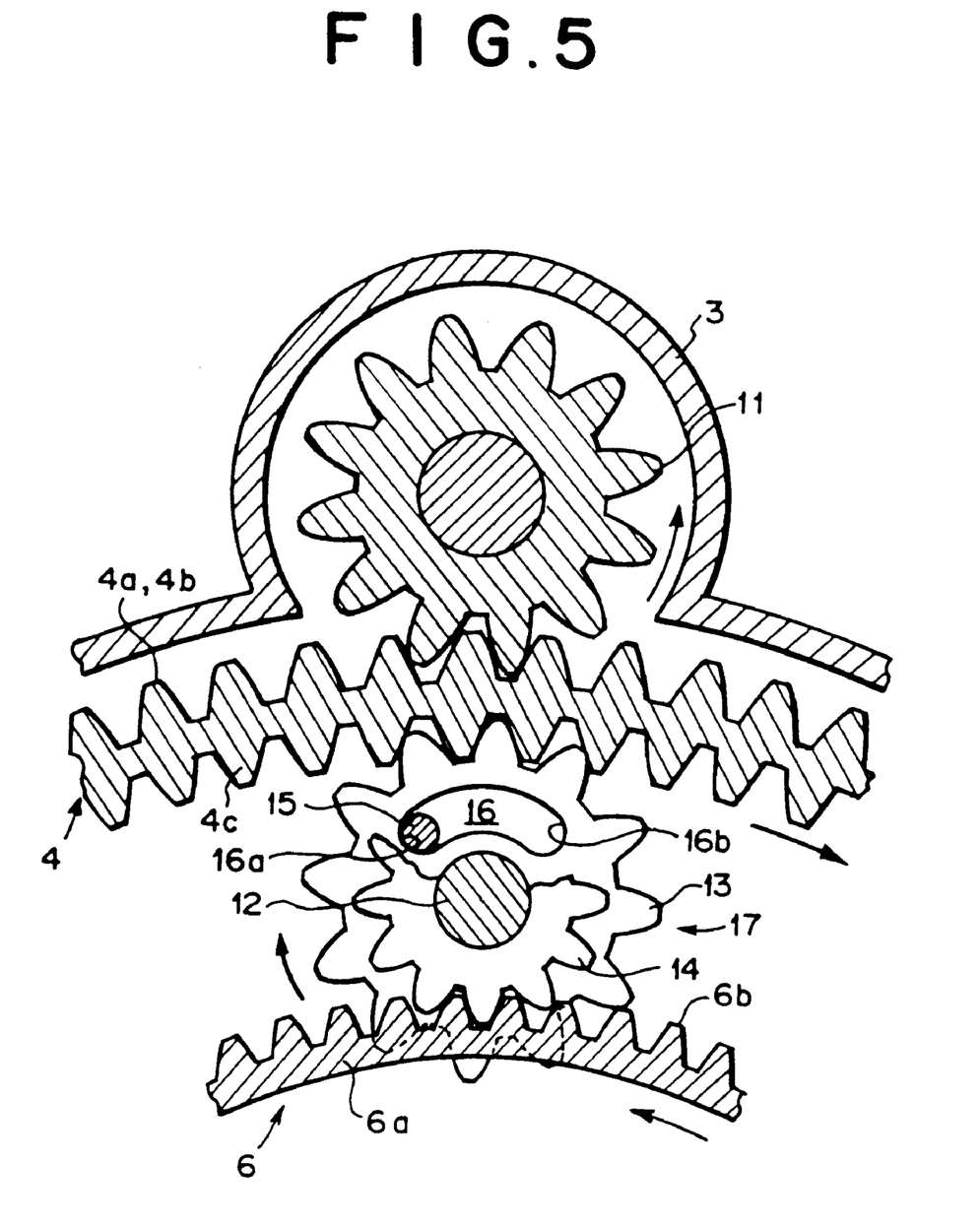
FIG. 5 is a cross-sectional view taken along line V—V in FIG. 4 with a part of the transmission gear removed.

A gear portion 4b is formed at a rear end portion of the male helicoid 4a on the outer circumferential surface of the intermediate barrel 4. The gear portion 4b is mesh with the long gear 11. With this arrangement, the intermediate barrel 4 is moved back and forth in the direction of the optical axis S while rotating relatively to the fixed barrel 3 when torque is transmitted to the intermediate barrel 4 from the long gear 11. As shown in FIGS. 4 and 5, a gear portion 4c is formed on the inner circumferential surface of the intermediate barrel 4 at a rear end portion thereof. A small diameter cylindrical portion 6a is formed on the cam barrel 6 at a rear end portion thereof and a gear portion 6b is formed on the outer circumferential surface of the cylindrical portion 6b.

Figure 6:
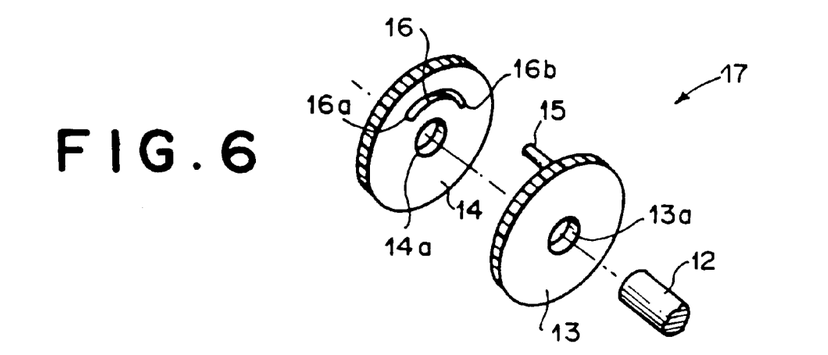
FIG. 6 is an exploded perspective view schematically showing the arrangement of the rotation transmission mechanism.

The key plate 9 is provided with a rotation transmission mechanism 17. As schematically shown in FIG. 6, the rotation transmission mechanism 17 comprises a drive gear 13 and an idle gear 14 which are respectively provided with shaft holes 13a and 14a and loosely fitted adjacent to each other on a shaft 12 fixed to the key plate 9. The drive gear 13 is in mesh with the gear portion 4c on the inner circumferential surface of the rear end portion of the intermediate barrel 4, and the idle gear 14 is in mesh with the gear portion 6b of the small diameter cylindrical portion 6a on the rear end of the cam barrel 6. One of the drive gear 13 and the idle gear 14 (the drive gear 13 in FIG. 6) is provided with a projection 15 (e.g., a pin) which projects toward the other (the idle gear 14 in FIG. 6), which is provided with an arcuate groove or slit 16 which extends coaxially with the shaft hole 14a through a predetermined angle range. The projection 15 is inserted into the arcuate groove 16.

Accordingly, in FIG. 16, when the drive gear 13 rotates in the counterclockwise direction, the idle gear 14 is rotated together with the drive gear 13 by way of engagement between the projection 15 on the drive gear 13 and an end face 16a of the groove 16 of the idle gear 14. Then when the drive gear 13 rotates in the clockwise direction in this state, the idle gear 14 is not rotated until the projection 15 is brought into engagement with the other end face 16b of the groove 16. Then when the drive gear 13 further rotates in the clockwise direction, the idle gear 14 is rotated together with the drive gear 13. Further when the drive gear 13 rotates in the counterclockwise direction in this state, the idle gear 14 is not rotated until the projection 15 is brought into engagement with the end face 16a of the groove 16.

In the embodiment shown in FIGS. 1 to 5, the projection 15 is provided on the idle gear 14 and the groove 16 is formed in the drive gear 13 in reverse to the arrangement shown in FIG. 6. This is because the idle gear 14 is made smaller than the drive gear 13 in diameter in order to prevent the idle gear 14 from contacting the gear portion 4c on the inner surface of the intermediate barrel 4.

A rear lens holder 19 holding a rear lens group (second lens group) 20 is disposed behind the front lens group (first lens group). The rear lens holder 19 is urged in the direction of the optical axis S by a spring 23. Three cam pins (cam followers) 21 extend radially outward from the outer surface of the rear lens holder 19 at substantially regular intervals in the circumferential direction of the lens holder 19.

Figure 7:
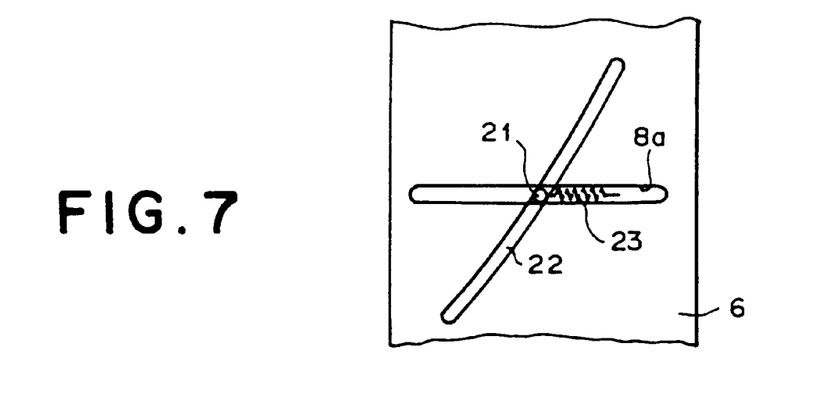
FIG. 7 is a development showing the cam groove of the cam barrel.

As shown in FIG. 7, a zooming cam groove (guide means) 22 which is at an angle to the optical axis S is formed on the cam barrel 6 for each cam pin 21. Each cam pin 21 extends through the cam barrel 6 into a groove 8a formed on the key barrel 8 to extend in the direction of the optical axis S. Accordingly when the cam barrel 6 rotates, the rear lens holder 19 is moved straight in the direction of the optical axis S under the guidance of the groove 8a.

A protrusion (not shown) is formed on the inner surface of the movable barrel 5 to extend in the direction of the optical axis S and is in engagement with a key groove (not shown) formed on the key barrel 8 to extend in the direction of the optical axis S. Further as described above, the male helicoid 5a on the outer surface of the movable barrel 5 is in engagement with the female helicoid 4d on the inner surface of the intermediate barrel 4. With this arrangement, the movable barrel 5 is moved straight in the direction of the optical axis S under the guidance of the key barrel 8 in response to rotation of the intermediate barrel 4. The direction of inclination of the cam grooves 22 to the optical axis S is set so that the front and rear lens groups 10 and 20 are moved in the same direction along the optical axis S to zoom the lens when the cam barrel 6 is rotated in a direction opposite to the direction of rotation of the intermediate barrel 4.

As shown in FIGS. 1 to 3, an encoder 25 which detects the focal length by detecting the position of the key plate 9 which is moved straight in the direction of the optical axis S in response to rotation of the intermediate barrel 4 is provided between the inner surface of the fixed barrel 3 and the key plate 9.

In the arrangement described above, when the intermediate barrel 4 is rotated in the clockwise direction (as seen in FIG. 5) by a motor (not shown) by way of the long gear 11, the intermediate barrel 4 is moved in the direction of the optical axis S while rotating and the movable barrel 5 is moved straight in the direction of the optical axis S under the guidance of the key barrel 8.

Further the drive gear 13 in mesh with the gear portion 4c on the intermediate barrel 4 is rotated in the clockwise direction in response to clockwise rotation of the intermediate barrel 4, and the end face 16a of the arcuate groove 16 in the drive gear 13 is brought into engagement with the projection 15 on the idle gear 14, thereby rotating the idle gear 14 in the clockwise direction together with the drive gear 13. Accordingly, the cam barrel 6 is rotated in the counterclockwise direction through the gear portion 6b thereon in mesh with the idle gear 14, whereby the front and rear lens groups 10 and 20 are moved in the same direction along the optical axis S and the lens is zoomed in one direction.

When the drive motor is reversed to rotate the intermediate barrel in the counterclockwise direction by a small angle at a desired focal length, the drive gear 13 is rotated in the counterclockwise direction. At this time, the idle gear 14 is not rotated until the other end face 16b of the arcuate groove 16 is brought into engagement with the projection 15. Accordingly only the front lens group 10 is moved in the direction of the optical axis S with the cam barrel 6 and the second lens group 20 kept stationary, whereby the zoom lens is focused.

When the intermediate barrel 4 is kept rotated in the counterclockwise direction after the end face 16b of the arcuate groove 16 is brought into engagement with the projection 15, the idle gear 14 is rotated in the counterclockwise direction together with the drive gear 13 and the cam barrel 6 is rotated in the clockwise direction, whereby the lens is zoomed in the other direction. When the intermediate barrel 4 is rotated in the clockwise direction again in this state, focusing is effected since only the front lens group 10 is moved in the direction of the optical axis S until the end face 16a is brought into engagement with the projection 15.

As can be understood from the description above, by virtue of the rotation transmission mechanism 17 disposed between the intermediate barrel 4 and the cam barrel 6 which can be engaged (a state where it transmits torque between the barrels 4 and 6) and disengaged (a state where it does not transmit torque between the barrels 4 and 6), a zoom lens barrel in which zooming and focusing can be effected by a single drive source and zooming can be effected continuously can be obatined at low cost without increasing the size and complicating the structure. That is, when the intermediate barrel 4 is rotated in one direction, the arcuate groove 16 and the projection 15 come to be engaged with each other in the direction of rotation so that the cam barrel 6 is rotated in response to rotation of the intermediate barrel 4, whereby the barrels 4 and 6 are rotated to zoom the lens. On the other hand when the intermediate barrel 4 is rotated in the other direction after zooming, the arcuate groove 16 and the projection 15 come to be disengaged from each other in the direction of rotation in the angle range of the arcuate groove 16, whereby only the intermediate barrel 4 is rotated to focus the lens.

The operation of the zoom lens barrel of this embodiment will be described with reference to FIGS. 8 and 9, hereinbelow.

Figure 8:
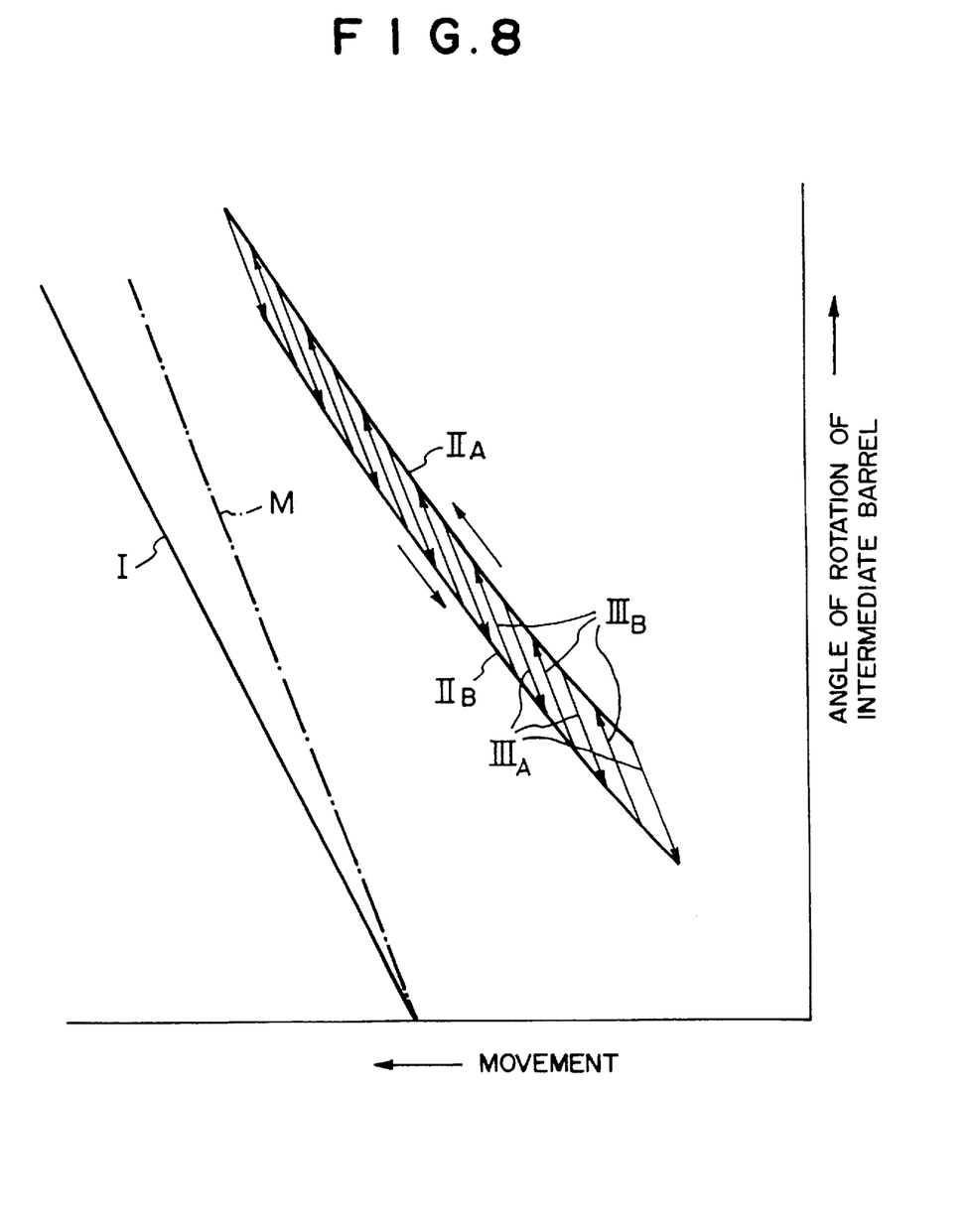
FIG. 8 is a view showing the movements of the intermediate barrel, the front lens group and the rear lens group for the angle of rotation of the intermediate barrel.

FIG. 8 is a view showing the movements of the intermediate barrel 4, the front lens group 10 and the rear lens group 20 for the angle of rotation of the intermediate barrel 4. In FIG. 8, straight line M represents the movement of the intermediate barrel 4 and straight line I represents the movement of the movable barrel 5, i.e., the front lens group 10. Line $II_A$ represents the movement of the rear lens group 20 when the zoom lens is zoomed from a wide-angle side to a telephoto side and Line $II_B$ represents the movement of the rear lens group 20 when the zoom lens is zoomed from a telephoto side to a wide-angle side. A plurality of parallel lines $III_A$ extending from line $II_A$ to $II_B$ represent the movement of the front lens group 10 when the intermediate barrel 4 is reversed to focus the lens after zooming from the wide-angle side to the telephoto side along line $II_A$. A plurality of parallel lines $III_B$ extending from line $II_B$ to $II_A$ represent the movement of the front lens group 10 when the intermediate barrel 4 is reversed to focus the lens after zooming from the telephoto side to the wide-angle side along line $II_B$. Lines $III_A$ and $III_B$ are parallel to line M representing the movement of the intermediate barrel 4.

Figure 9:
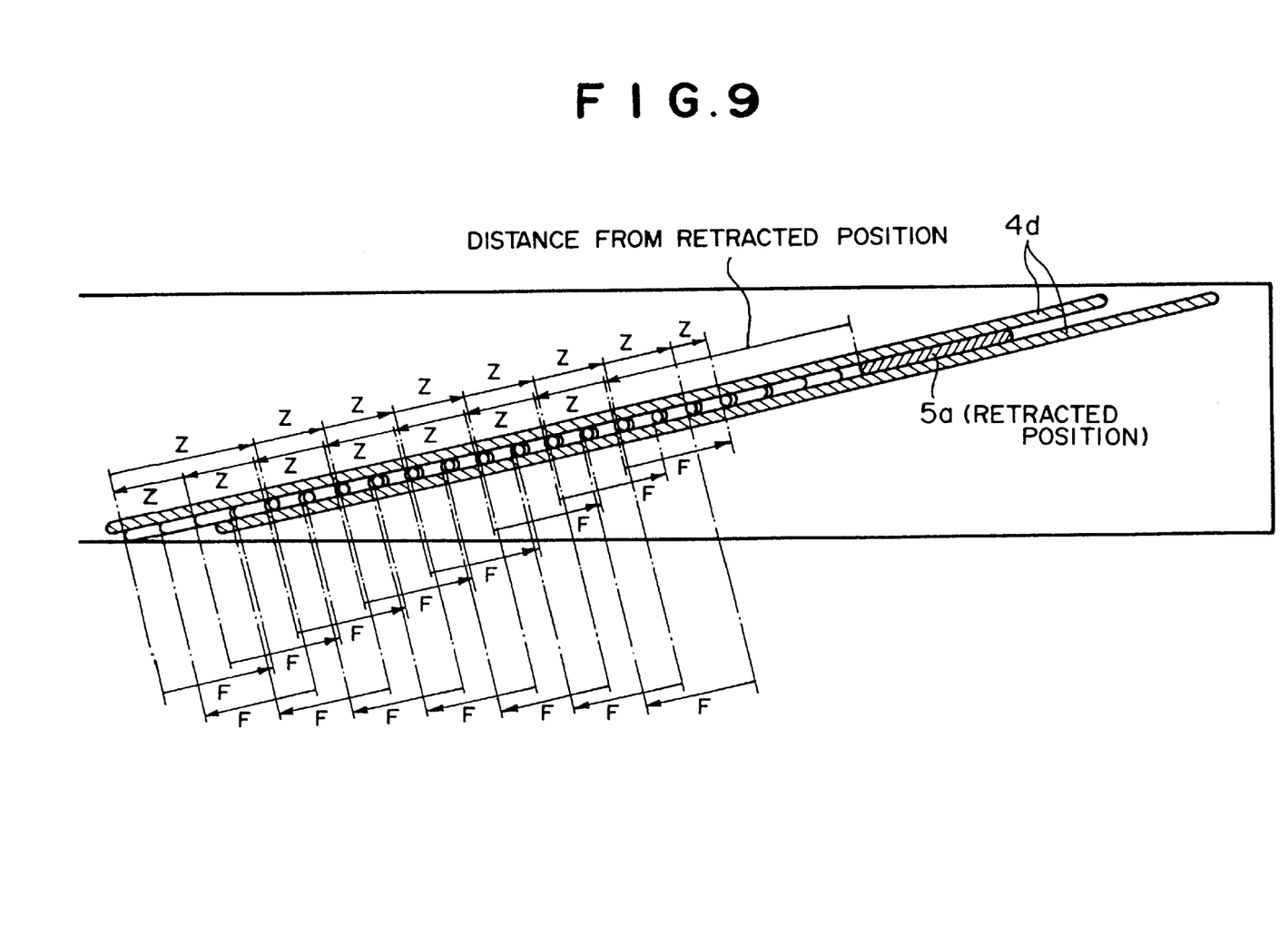
FIG. 9 is a view for illustrating the relation between the female helicoid on the intermediate barrel and the male helicoid on the movable barrel, the zooming area and the focusing area.

FIG. 9 is a view for illustrating the relation between the female helicoid 4d on the intermediate barrel 4 and the male helicoid 5a on the movable barrel 5, the zooming area Z and the focusing area F. The relation between the female helicoid 3c on the fixed barrel 3 and the male helicoid 4a on the intermediate barrel 4 is the same as that between the female helicoid 4d on the intermediate barrel 4 and the male helicoid 5a on the movable barrel 5.

As can be seen from FIG. 9, each focusing area F extends beyond the zooming area Z and is sufficiently wide.

Though, in the embodiment described above, the front lens group 10 forms the first lens group and the rear lens group 20 forms the second lens group, the rear lens group 20 may form the first lens group and the front lens group 10 may form the second lens group.

Further though, in the embodiment described above, focusing is effected by rotating only the intermediate barrel (first rotary barrel) 4 to move the movable barrel 5 with the cam barrel (second rotary barrel) 6 held stationary, focusing may be effected by rotating only the cam barrel 6 with the intermediate barrel 4 held stationary.

Figure 10:
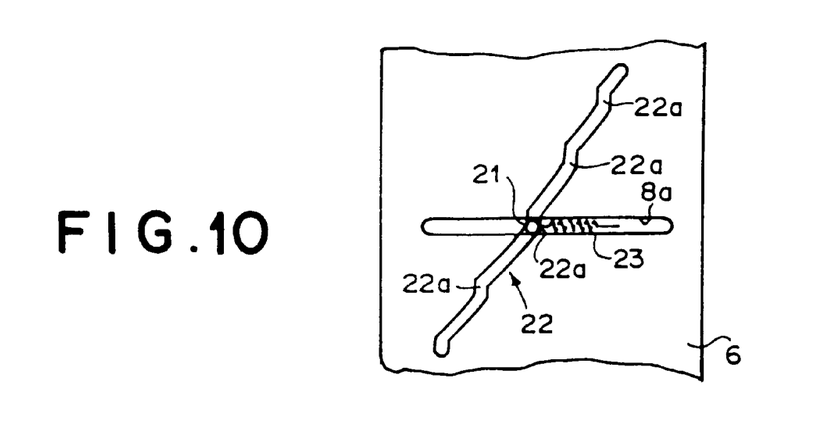
FIG. 10 is a development showing a modification of the cam groove on the cam barrel.

In the embodiment described above, since the cam grooves 22 are inclined to the optical axis S and the rear lens group holder 19 provided with the cam pins 21 is urged in the direction of the optical axis S by the spring 23, there is fear that the cam barrel 6 is rotated during focusing by the spring 23 and/or other external turbulence. Such an unintended rotation of the cam barrel 6 during focusing can be prevented by forming groove portions 22a extending in perpendicular to the optical axis S at a plurality of places of the cam groove 22 as shown in FIG. 10, and effecting focusing when the cam pin 21 is in the groove portions 22a, though this results in step zooming.

What is claimed is:

1. A lens barrel for a zoom lens comprising
   first and second lens groups arranged in the direction of an optical axis,
   a first rotary barrel which is rotatable about the optical axis and is rotated to move the first lens group in the direction of the optical axis,
   a second rotary barrel provided coaxially with the first rotary barrel,
   a guide means which is provided on the second rotary barrel and guides the second lens group to move it in the direction of the optical axis in response to rotation of the second rotary barrel, and
   a rotation transmission mechanism which is disposed between the first and second rotary barrels engageable to rotate both the first and second rotary barrels, thereby zooming the zoom lens, and disengageable to rotate only one of the first and second rotary barrels through a predetermined angle range with the other held stationary so that focusing the zoom lens is effected by rotating said one rotary barrel within the predetermined angle range.

2. A lens barrel as defined in claim 1 in which the second lens group is positioned reaward of the first lens group in the direction of the optical axis and the rotation transmission mechanism disengages to rotate only the first rotary barrel through the predetermined angle range with the second rotary barrel held stationary.

3. A lens barrel as defined in claim 2 in which zooming in one direction is effected by rotating the first rotary barrel in one direction, and focusing is effected by rotating the first rotary barrel in the other direction within the predetermined angle range, while zooming in the other direction is effected by rotating the first rotary barrel in the other direction beyond the predetermined angle range, and focusing is effected by rotating the first rotary barrel in said one direction within the predetermined angle range.

4. A lens barrel as defined in claim 3 in which the second rotary barrel is disposed inside the first rotary barrel, and the rotation transmission mechanism comprises a drive gear which is in mesh with a gear portion formed on the inner circumferential surface of the first rotary barrel, and idle gear which is disposed coaxially with the drive gear and is in mesh with a gear portion formed on the outer circumferential surface of the second rotary barrel, a projection provided on one of the drive gear and the idle gear, and a pair of engagement portions which are provided on the other of the drive gear and the idle gear so that the engagement portions are brought into engagement with the projection at the respective ends of said predetermined angle range.

5. A lens barrel as defined in claim 4 in which the engagement portions are the end faces of an arcuate groove or slit which is formed on one of the drive gear and the idle gear to extend through said predetermined angle range coaxially with the gear and into which the projection on the other gear is inserted.

6. A lens barrel as defined in claim 2 in which the guide means is a cam groove which is formed on the second rotary barrel and with which a cam follower formed on a lens holder holding the second lens group is engaged.

7. A lens barrel as defined in claim 6 in which the cam groove is provided with portions which extend in perpendicular to the optical axis through the angle range through which only the first rotary barrel is rotated.

\* \* \* \* \*